US011092052B2

(12) United States Patent
Takase

(10) Patent No.: US 11,092,052 B2
(45) Date of Patent: Aug. 17, 2021

(54) ELECTRIC HEATING TYPE SUPPORT, EXHAUST GAS PURIFYING DEVICE, AND METHOD FOR PRODUCING ELECTRIC HEATING TYPE SUPPORT

(71) Applicant: NGK INSULATORS, LTD., Nagoya (JP)

(72) Inventor: Naoya Takase, Nagoya (JP)

(73) Assignee: NGK Insulators, Ltd., Nagoya (JP)

(*) Notice: Subject to any disclaimer, the term of this patent is extended or adjusted under 35 U.S.C. 154(b) by 0 days.

(21) Appl. No.: 16/798,984

(22) Filed: Feb. 24, 2020

(65) Prior Publication Data
US 2020/0291841 A1 Sep. 17, 2020

(30) Foreign Application Priority Data

Mar. 15, 2019 (JP) .............................. JP2019-049054
Feb. 7, 2020 (JP) .............................. JP2020-020112

(51) Int. Cl.
F01N 3/20 (2006.01)
F01N 3/022 (2006.01)
(Continued)

(52) U.S. Cl.
CPC ......... F01N 3/2026 (2013.01); F01N 3/0222 (2013.01); F01N 13/16 (2013.01);
(Continued)

(58) Field of Classification Search
CPC combination set(s) only.
See application file for complete search history.

(56) References Cited

U.S. PATENT DOCUMENTS 5,571,485 A * 11/1996 Brunson ............ B01D 53/9454
422/174
8,803,043 B2 * 8/2014 Sakashita .............. F01N 3/2026
219/553
(Continued)

FOREIGN PATENT DOCUMENTS

EP 2 732 875 A1 5/2014
EP 2 784 047 A2 10/2014
(Continued)

OTHER PUBLICATIONS

Extended European Search Report (Application No. 20163147.0) dated Aug. 5, 2020.

Primary Examiner — Binh Q Tran
(74) Attorney, Agent, or Firm — Burr & Brown, PLLC

(57) ABSTRACT

An electric heating support includes an electrically conductive honeycomb structure having an outer peripheral wall and porous partition walls disposed on an inner side of the outer peripheral wall, the porous partition walls defining a plurality of cells, each cell penetrating from one end face to other end face to form a flow path. A pair of metal terminals are disposed so as to face each other across a central axis of the honeycomb structure, each metal terminal being joined to a surface of the honeycomb structure via a welded portion. The honeycomb structure is composed of ceramics and a metal. The honeycomb structure contains 40% by volume or less of the metal. The welded portion of the honeycomb structure has a surface containing 40% by volume or more of the metal.

11 Claims, 9 Drawing Sheets

(51) Int. Cl.
   *F01N 13/16* (2010.01)
   *B01D 46/24* (2006.01)
   *B23K 101/02* (2006.01)
   *B01D 53/94* (2006.01)
   *H05B 6/64* (2006.01)
   *C04B 111/94* (2006.01)
   *H05B 6/70* (2006.01)
   *C04B 38/00* (2006.01)

(52) U.S. Cl.
   CPC ......... *B01D 46/2429* (2013.01); *B01D 53/94* (2013.01); *B23K 2101/02* (2018.08); *C04B 38/0006* (2013.01); *C04B 2111/94* (2013.01); *F01N 3/2013* (2013.01); *F01N 2240/16* (2013.01); *H05B 6/6447* (2013.01); *H05B 6/701* (2013.01)

(56) References Cited

U.S. PATENT DOCUMENTS

| | | | |
|---|---|---|---|
| 10,655,526 B1* | 5/2020 | Okamoto | F01N 3/2828 |
| 2012/0076699 A1* | 3/2012 | Ishihara | B01J 19/2485 422/174 |
| 2013/0036719 A1* | 2/2013 | Noguchi | F01N 3/2026 55/523 |
| 2015/0292386 A1* | 10/2015 | Nishigaya | F01N 3/2026 60/320 |
| 2018/0280872 A1 | 10/2018 | Noro | |

FOREIGN PATENT DOCUMENTS

| | | |
|---|---|---|
| EP | 2 792 396 A1 | 10/2014 |
| JP | H08-001012 A1 | 1/1996 |
| JP | 2018-172258 A1 | 11/2018 |

* cited by examiner

ELECTRIC HEATING TYPE SUPPORT, EXHAUST GAS PURIFYING DEVICE, AND METHOD FOR PRODUCING ELECTRIC HEATING TYPE SUPPORT

FIELD OF THE INVENTION

The present invention relates to an electric heating type support, an exhaust gas purifying device, and a method for producing an electric heating type support. More particularly, the present invention relates to an electric heating type support, an exhaust gas purifying device, and a method for producing the electric heating type support, which have good joining reliability between a metal terminal and a honeycomb structure.

Conventionally, a catalyst supported on a pillar shaped honeycomb structure having a plurality of partition walls that define a plurality of cells penetrating from one end face to other end face to form flow paths is used in order to purify harmful substances such as HC, CO, and $NO_x$ contained in an exhaust gas discharged from an engine of a motor vehicle or the like. Thus, when treating the exhaust gas with the catalyst supported on the honeycomb structure, it is necessary to raise the temperature of the catalyst to its activation temperature. However, at the time of starting of the engine, the catalyst does not reach the activation temperature. Therefore, there is a problem that the exhaust gas is not sufficiently purified. In particular, a plug-in hybrid vehicle (PHEV) or a hybrid vehicle (HV) includes traveling only with a motor in the travel motion, so that it has less engine start frequency and also a decreased catalyst temperature at the time of starting of the engine, which will tend to deteriorate exhaust gas purification performance.

To solve the problem, an electric heating catalyst (EHC) has been proposed, in which a pair of terminals are connected to a pillar shaped honeycomb structure composed of conductive ceramics, and the honeycomb structure itself is heated by electric conduction, so that the temperature of the catalyst can be raised to its activation temperature before starting of the engine. The EHC is desired to reduce temperature unevenness in the honeycomb structure to have a uniform temperature distribution, in order to obtain a sufficient catalytic effect.

The terminals are generally composed of a metal, which is different from the material of the honeycomb structure composed of ceramics. Therefore, applications used in a high-temperature oxidizing atmosphere such as in an exhaust pipe of a motor vehicle are required to ensure mechanical and electrical joining reliability between the honeycomb structure and the metal terminals in the high-temperature atmosphere.

To solve such problems, Patent document 1 discloses a technique for applying thermal energy from metal terminal sides to join metal terminals to electrode layers of a honeycomb structure by means of welding. Further, it discloses that according to such a structure, it is possible to provide a conductive honeycomb structure with improved joining reliability to the metal terminals.

CITATION LIST

Patent Literature

Patent Document 1: Japanese Patent Application Publication No. 2018-172258 A

SUMMARY OF THE INVENTION

As a result of studies, the present inventors have found that the electrically conductive honeycomb structure of Patent Document 1 has the following problems. That is, the present inventors have found that when welding the electrode layers of the honeycomb structure and the metal terminals by irradiation with laser, a decreased amount of a metal contained on the electrode layer side decreases surfaces that are molten with the metal terminals, resulting in difficulty in good joining between the honeycomb structure and the metal terminals. On the other hand, the present inventors have found that an increased metal content in the honeycomb structure increases a difference in thermal expansion between the ceramics of the metal terminals and those of the honeycomb structure, resulting in easy cracking. Thus, conventionally, there has been a problem regarding joining reliability due to poor joining between the honeycomb structure and the metal terminals and the cracking, and there has been room for improvement.

The present invention has been made in view of the above circumstances. An object of the present invention is to provide an electric heating type support, an exhaust gas purifying device, and a method for producing an electric heating type support, which have good joining reliability between a metal terminal and a honeycomb structure.

As a result of intensive studies, the present inventors have found that the above problems can be solved by containing 40% by volume or more of a metal in welded portions of the honeycomb structure to the metal terminals. Thus, the present invention is specified as follows:

(1)

An electric heating type support, comprising:

an electrically conductive honeycomb structure comprising a pillar shaped honeycomb structure portion, the pillar shaped honeycomb structure portion comprising: an outer peripheral wall; and porous partition walls disposed on an inner side of the outer peripheral wall, the porous partition walls defining a plurality of cells, each cell penetrating from one end face to other end face to form a flow path; and a pair of metal terminals disposed so as to face each other across a central axis of the pillar shaped honeycomb structure portion, each metal terminal being joined to a surface of the electrically conductive honeycomb structure via a welded portion, wherein the pillar shaped honeycomb structure portion is composed of ceramics and a metal, the pillar shaped honeycomb structure portion containing 40% by volume or less of the metal, and wherein the welded portion of the electrically conductive honeycomb structure has a surface containing 40% by volume or more of the metal.

(2)

An exhaust gas purifying device, comprising:

the electric heating type support according to (1); and a can body for holding the electric heating type support.

(3)

A method for producing an electric heating type support, the electric heating type support comprising:

an electrically conductive honeycomb structure comprising a pillar shaped honeycomb structure portion composed of ceramics and a metal, the pillar shaped honeycomb structure portion comprising: an outer peripheral wall; and porous partition walls disposed on an inner side of the outer peripheral wall, the porous partition walls defining a plurality of cells, each cell penetrating from one end face to other end face to form a flow path; and a pair of metal terminals disposed so as to face each other across a central axis of the pillar shaped honeycomb structure portion, the method comprising the steps of:

forming a surface containing 40% or more of the metal by applying a first thermal energy to a surface of the electrically conductive honeycomb structure; and disposing each of the metal terminals in a portion having the surface containing 40% or more of the metal and applying a second thermal energy larger than the first thermal energy to each of the metal terminals to join each of the metal terminals to the surface of the electrically conductive honeycomb structure.

(4)

A method for producing an electric heating type support, the electric heating type support comprising:

an electrically conductive honeycomb structure comprising a pillar shaped honeycomb structure portion, the pillar shaped honeycomb structure portion being composed of ceramics having a melting point of 1600° C. or less and a metal and comprising: an outer peripheral wall; and porous partition walls disposed on an inner side of the outer peripheral wall, the porous partition walls defining a plurality of cells, each cell penetrating from one end face to other end face to form a flow path; and a pair of metal terminals disposed so as to face each other across a central axis of the pillar shaped honeycomb structure portion, the method comprising the steps of:

applying a first thermal energy to a surface of the electrically conductive honeycomb structure to evaporate at least a part of the ceramics to form a surface containing 40% or more of the metal; and disposing each of the metal terminals in a portion having the surface containing 40% or more of the metal and applying a second thermal energy larger than the first thermal energy to each of the metal terminals to join each of the metal terminals to the surface of the electrically conductive honeycomb structure.

Advantageous Effects of Invention

According to the present invention, it is possible to provide an electric heating type support, an exhaust gas purifying device, and a method for producing an electric heating type support, which have good joining reliability between a metal terminal and a honeycomb structure.

DETAILED DESCRIPTION OF THE INVENTION

Hereinafter, embodiments according to the present invention will be specifically described with reference to the drawings. It is to understand that the present invention is not limited to the following embodiments, and various design modifications and improvements may be composed based on ordinary knowledge of a person skilled in the art, without departing from the spirit of the present invention.

Embodiment 1

(1. Electric Heating Type Support)

Figure 1:
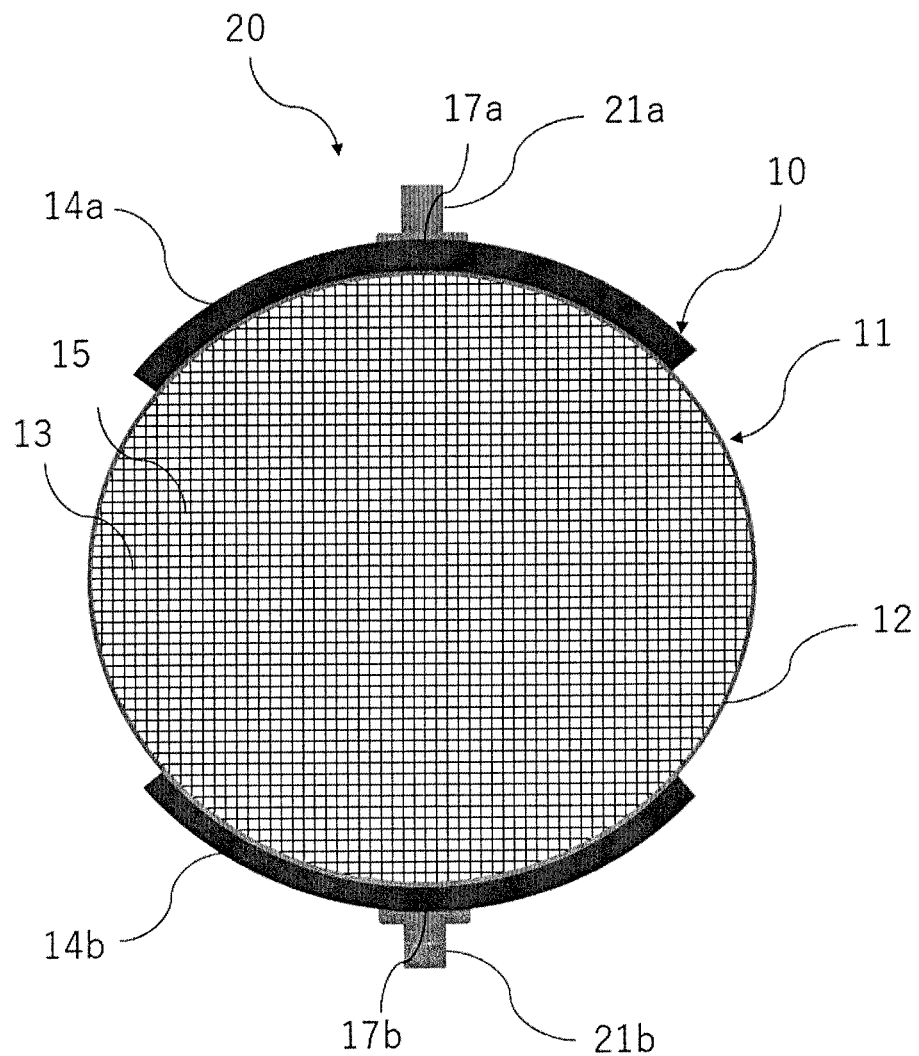
FIG. 1 is a schematic cross-sectional view of an electric heating type support according to Embodiment 1 of the present invention, which is perpendicular to a cell extending direction.

FIG. 1 is a schematic cross-sectional view of an electric heating type support 20 according to Embodiment 1 of the present invention, which is perpendicular to a cell extending direction. The electric heating type support 20 includes a honeycomb structure 10 and a pair of metal terminals 21a, 21b.

(1-1. Honeycomb Structure)

Figure 2:
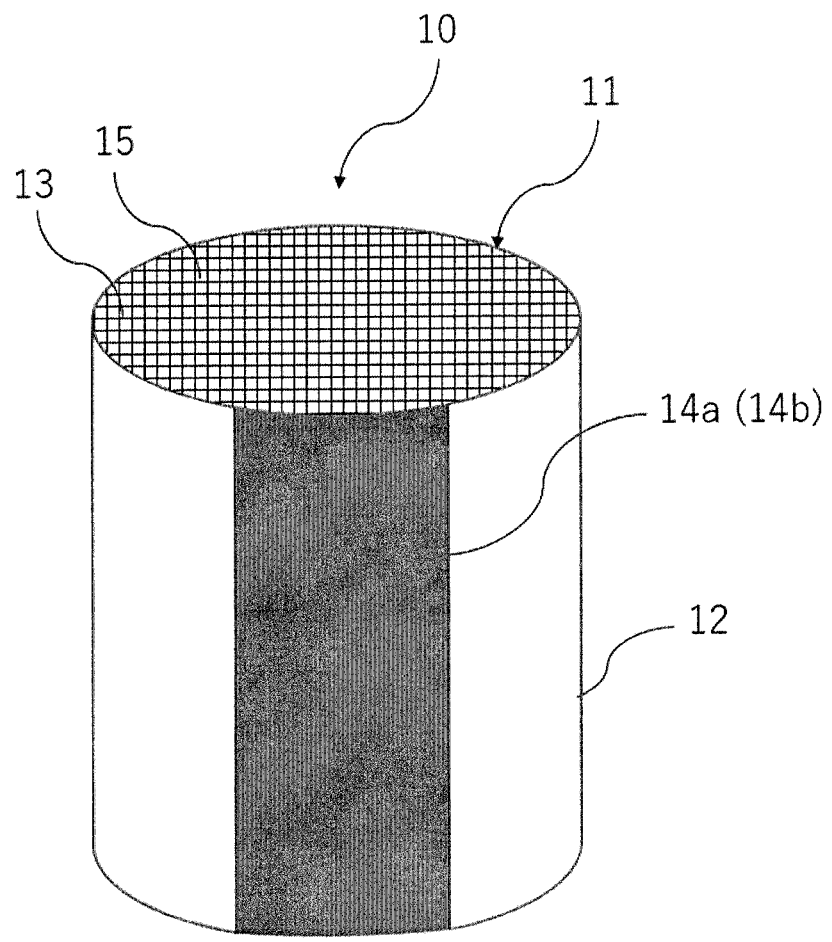
FIG. 2 is a schematic external view of a honeycomb structure according to Embodiment 1 of the present invention.

FIG. 2 is a schematic external view of the electrically conductive honeycomb structure 10 according to Embodiment 1 of the present invention. The electrically conductive honeycomb structure 10 is provided with a pillar shaped honeycomb structure portion 11 including: an outer peripheral wall 12; and porous partition walls 13 which are disposed on an inner side of the outer peripheral wall 12 and define a plurality of cells 15 penetrating from one end face to other end face to form flow paths.

An outer shape of the pillar shaped honeycomb structure portion 11 is not particularly limited as long as it is pillar shaped. For example, the honeycomb structure portion can have a shape such as a pillar shape with circular end faces (circular pillar shape) and a pillar shape with polygonal (square, pentagonal, hexagonal, heptagonal, octagonal, etc.) end faces. The pillar shaped honeycomb structure portion 11 preferably has a size of each end face of from 2000 to 20000 mm$^2$, and more preferably from 5000 to 15000 mm$^2$, for the purpose of improving heat resistance (suppressing cracks entering the outer peripheral wall in a circumferential direction).

The pillar shaped honeycomb structure portion 11 has electrical conductivity. Electrical resistivity of the ceramic is not particularly limited as long as the electrically conductive honeycomb structure 10 can generate heat by Joule heat upon electrical conduction. The electrical resistivity is preferably from 1 to 200 Ωcm, and more preferably from 10 to 100 Ωcm. In the present invention, the electrical resistivity of the pillar shaped honeycomb structure portion 11 is a value measured at 400° C. by a four-terminal method.

The pillar shaped honeycomb structure portion 11 is composed of ceramics and a metal and containing 40% by volume or less of the metal. The pillar shaped honeycomb structure portion 11 may have 30% by volume of less, or 20% by volume or less, or 10% by volume or less, of the metal component. The materials of the pillar shaped honeycomb structure portion 11 composed of the ceramics and the metal can be selected from, but not limited to, oxide ceramics such as alumina, mullite, zirconia, and cordierite, and non-oxide ceramics such as silicon carbide, silicon nitride, and aluminum nitride. Further, a silicon carbide-metallic silicon composite material, a silicon carbide/graphite composite material, or the like can also be used. Among them, from the viewpoint of compatibility of heat resistance and conductivity, preferably, the honeycomb structure portion 11 preferably contains ceramics mainly based on a silicon-silicon carbide composite material or silicon carbide and the metal, and more preferably, it contains a silicon-silicon carbide composite material or silicon carbide and the metal. The phrase "the honeycomb structure portion 11 contains ceramics mainly based on a silicon-silicon carbide composite" means that the pillar shaped honeycomb structure portion 11 contains 90% by mass or more of the silicon-silicon carbide composite material (total mass) based on the entire honeycomb structure. Here, for the silicon-silicon carbide composite material, it contains silicon carbide particles as an aggregate and silicon as a bonding material for bonding the silicon carbide particles, and a plurality of silicon carbide particles are bonded by silicon so as to form pores between the silicon carbide particles. The phrase "the pillar shaped honeycomb structure portion 11 contains ceramics mainly based on silicon carbide" means that the pillar shaped honeycomb structure portion 11 contains 90% by mass or more of silicon carbide (total mass) based on the entire honeycomb structure.

When the pillar shaped honeycomb structure portion 11 contains the silicon-silicon carbide composite material, a ratio of a "mass of silicon as a bonding material" contained in the pillar shaped honeycomb structure portion 11 to the total of a "mass of silicon carbide particles as an aggregate" contained in the pillar shaped honeycomb structure portion 11 and a "mass of silicon as a bonding material" contained in the pillar shaped honeycomb structure portion 11 is preferably from 10 to 40% by mass, and more preferably from 15 to 35% by mass. When it is 10% by mass or more, the strength of the pillar shaped honeycomb structure portion 11 is sufficiently maintained. When it is 40% by mass or less, the shape is easily maintained during firing.

A shape of each cell in a cross section perpendicular to an extending direction of the cells 15 is not limited, but it is preferably a square, a hexagon, an octagon, or a combination thereof. Among these, the square and the hexagon are preferred. Such a cell shape can lead to a decreased pressure loss upon flowing of an exhaust gas through the pillar shaped honeycomb structure portion 11, resulting in improvement of purification performance of the catalyst. The rectangle is particularly preferable in terms of easily achieving both structural strength and heating uniformity.

Each of the partition walls 13 forming the cells 15 preferably has a thickness of from 0.1 to 0.3 mm, and more preferably from 0.15 to 0.25 mm. The thickness of each partition wall 13 of 0.1 mm or more can suppress a decrease in the strength of the honeycomb structure. The thickness of each partition wall 13 of 0.3 mm or less can suppress an increase in pressure loss upon flowing of an exhaust gas, when the honeycomb structure is used as a catalyst support and a catalyst is supported thereon. In the present invention, the thickness of the partition wall 13 is defined as a length of a portion passing through the partition wall 13, among line segments connecting centers of gravity of the adjacent cells 15 in a cross section perpendicular to the extending direction of the cells 15.

The pillar shaped honeycomb structure portion 11 preferably has a cell density of from 40 to 150 cells/cm$^2$, and more preferably from 70 to 100 cells/cm$^2$, in a cross section perpendicular to a flow path direction of cells 15. The cell density in such a range can increase the purification performance of the catalyst while reducing the pressure loss upon flowing of an exhaust gas. The cell density of higher than or equal to 40 cells/cm$^2$ ensures a sufficient catalyst supporting area. The cell density of lower than or equal to 150 cells/cm$^2$ can prevent a pressure loss upon flowing of an exhaust gas from being excessively increased when the pillar shaped honeycomb structure portion 11 is used as a catalyst support and a catalyst is supported thereon. The cell density is a value obtained by dividing the number of cells by an area of one end face of the pillar shaped honeycomb structure portion 11 excluding the outer peripheral wall 12.

The provision of the outer peripheral wall 12 of the pillar shaped honeycomb structure portion 11 is useful in terms of ensuring the structural strength of the pillar shaped honeycomb structure portion 11 and preventing a fluid flowing through the cells 15 from leaking from the outer peripheral wall 12. More particularly, the thickness of the outer peripheral wall 12 is preferably 0.1 mm or more, and more preferably 0.15 mm or more, and even more preferably 0.2 mm or more. However, if the outer peripheral wall 12 is too thick, the strength becomes too high, so that a strength balance between the outer peripheral wall and the partition wall 13 is lost to reduce thermal shock resistance. Therefore, the thickness of the outer peripheral wall 12 is preferably 1.0 mm or less, and more preferably 0.7 mm or less, and still more preferably 0.5 mm or less. As used herein, the thickness of the outer peripheral wall 12 is defined as a thickness of the outer peripheral wall 12 in a direction of a normal line to a tangential line at a measurement point when observing a portion of the outer peripheral wall 12 to be subjected to thickness measurement in a cross section perpendicular to a cell extending direction.

The partition walls 13 can be porous. A porosity of the partition wall 13 is preferably from 35 to 60%, and more preferably from 35 to 45%. The porosity of 35% or more can lead to more easy suppression of deformation during firing. The porosity of 60% or less can allow the strength of the honeycomb structure to be sufficiently maintained. The porosity is a value measured by a mercury porosimeter.

The partition walls 13 of the pillar shaped honeycomb structure portion 11 preferably have an average pore diameter of from 2 to 15 μm, and more preferably from 4 to 8 μm. The average pore diameter of 2 μm or more can prevent excessively high electric resistivity. The average pore diameter of 15 μm or less can prevent excessively low electric resistivity. The average pore diameter is a value measured by a mercury porosimeter.

The electrically conductive honeycomb structure 10 includes a pair of electrode layers 14a, 14b composed of the ceramics and the metal, which are disposed on the surface of the outer peripheral wall 12 of the pillar shaped honeycomb structure portion 11. One electrode layer of the pair of electrode layers is provided so as to face other electrode layer of the pair of electrode layers across a center axis of the pillar shape honeycomb structure portion 11. The pair of electrode layers 14a and 14b include welded portions 17a, 17b, respectively.

The electrode layers 14a, 14b may be formed in a non-limiting region. In terms of enhancing uniform heat generation of the pillar shaped honeycomb structure portion 11, each of the electrode layers 14a, 14b is preferably provided so as to extend in a form of belt in the circumferential direction and the cell extending direction. More particularly, It is desirable that each of the electrode layers 14a, 14b extends over a length of 80% or more, and preferably 90% or more, and more preferably the full length, between both end faces of the pillar shaped honeycomb structure portion 11, from the viewpoint that a current easily spreads in an axial direction of each of the electrode layers 14a, 14b.

Each of the electrode layers 14a, 14b preferably has a thickness of from 0.01 to 5 mm, and more preferably from 0.01 to 3 mm. Such a range can allow uniform heat generation to be enhanced. The thickness of each of the electrode layers 14a, 14b of 0.01 mm or more can lead to appropriate control of electric resistance, resulting in more uniform heat generation. The thickness of each of the electrode layers 14a, 14b of 5 mm or less can reduce a risk of breakage during canning. The thickness of each of the electrode layers 14a, 14b is defined as a thickness in a direction of a normal line to a tangential line at a measurement point on an outer surface of each of the electrode layers 14a, 14b when observing the point of each electrode layer to be subjected to thickness measurement in a cross section perpendicular to the cell extending direction.

The electric resistivity of each of the electrode layers 14a, 14b is lower than the electric resistivity of the pillar shaped honeycomb structure portion 11, whereby the electricity tends to flow preferentially to the electrode layers, and the electricity tends to spread in the cell flow path direction and the circumferential direction during electric conduction. The electric resistivity of the electrode layers 14a, 14b is preferably 1/10 or less, and more preferably 1/20 or less, and even more preferably 1/30 or less, of the electric resistivity of the pillar shaped honeycomb structure portion 11. However, if the difference in electric resistivity between both becomes too large, the current is concentrated between ends of the opposing electrode layers to bias the heat generated in the pillar shaped honeycomb structure portion. Therefore, the electric resistivity of the electrode layers 14a, 14b is preferably 1/200 or more, and more preferably 1/150 or more, and even more preferably 1/100 or more, of the electric resistivity of the pillar shaped honeycomb structure portion 11. In the present invention, the electric resistivity of the electrode layers 14a, 14b is a value measured at 400° C. by a four-terminal method.

Each of the electrode layers 14a, 14b may be composed of a composite material of a metal and conductive ceramics (cermet). Examples of the metal include a single metal of Cr, Fe, Co, Ni, Si or Ti, or an alloy containing at least one metal selected from the group consisting of those metals. Non-limiting examples of the conductive ceramic include silicon carbide (SiC), and metal compounds such as metal silicides such as tantalum silicide ($TaSi_2$) and chromium silicide ($CrSi_2$). Specific examples of the composite material of the metal and the conductive ceramics (cermet) include a composite material of metallic silicon and silicon carbide, a composite material of metallic silicide such as tantalum silicide and chromium silicide, metallic silicon and silicon carbide, and further a composite material containing, in addition to one or more metals listed above, one or more insulating ceramics such as alumina, mullite, zirconia, cordierite, silicon nitride, and aluminum nitride, in terms of decreased thermal expansion. As the material of the electrode layers 14a, 14b, among the various metals and conductive ceramics as described above, a combination of a metal silicide such as tantalum silicide and chromium silicide with a composite material of metallic silicon and silicon carbide is preferable, because it can be fired simultaneously with the pillar shaped honeycomb structure portion, which contributes to simplification of the producing steps.

(1-2. Metal Terminal)

The pair of metal terminals 21a, 21b are disposed so as to face each other across the central axis of the pillar shaped honeycomb structure portion 11 of the honeycomb structure 10, and are provided on the pair of electrode layers 14a, 14b, respectively, and are electrically connected. Accordingly, as a voltage is applied to the metal terminals 21a, 21b through the electrode layers 14a, 14b, then the electricity is conducted through the metal terminals 21a, 21b to allow the electrically conductive honeycomb structure 10 to generate heat by Joule heat. Therefore, the electrically conductive honeycomb structure 10 can also be suitably used as a heater. The applied voltage is preferably from 12 to 900 V, and more preferably from 64 to 600 V, although the applied voltage can be changed as needed.

The pair of metal terminals 21a, 21b are joined to a surface of the honeycomb structure 10 via welded portions 17a, 17b, respectively.

The material of the metal terminals 21a, 21b is not particularly limited as long as it is a metal, and a single metal, an alloy, or the like can be employed. In terms of corrosion resistance, electrical resistivity and linear expansion coefficient, for example, the material is preferably an alloy containing at least one selected from the group consisting of Cr, Fe, Co, Ni and Ti, and more preferably stainless steel and Fe—Ni alloys. The shape and size of each of the metal terminals 21a, 21b are not particularly limited, and they can be appropriately designed according to the size of the electric heating type support 20, the electrical conduction performance, and the like.

The metal terminals 21a, 21b are joined to the electrode layers 14a, 14b, respectively, via one or more welded portions 17a, 17b. A decrease in a welded area of each of the welded portions 17a, 17 can suppress cracking and peeling due to a difference in thermal expansion. More particularly, the welded area of each of the welded portions 17a, 17b per a portion is preferably 50 $mm^2$ or less, and more preferably 45 $mm^2$ or less, and still more preferably 40 $mm^2$ or less, and even more preferably 30 $mm^2$ or less. However, if the welded area of each of the welded portions 17a, 17b per a portion is excessively small, the joining strength cannot be ensured. Therefore, it is preferably 2 $mm^2$ or more, and more preferably 3 $mm^2$ or more, and even more preferably 4 $mm^2$ or more.

Two or more welded portions 17a, 17b are preferably formed to increase the total welded area, thereby increasing the joining strength, although it depends on the size of the metal terminals 21a, 21b. More particularly, the total welded area of one or more welded portions per each metal terminal is preferably 2 $mm^2$ or more, and more preferably 3 $mm^2$ or more, and even more preferably 4 $mm^2$ or more. On the other hand, if the total welded area is excessively large, the thermal shock resistance tends to deteriorate. Therefore, in terms of ensuring the thermal shock resistance, the total welded area of one or two or more welded portions 17a, 17b per each metal terminal is preferably 120 $mm^2$ or less, and more preferably 110 $mm^2$ or less, and even more preferably 100 $mm^2$ or less.

When two or more welded portions 17a, 17b are provided for each metal terminal, it is preferable that a distance between adjacent welded portions is maintained at a certain level or more depending on the welded areas of the welded portions, in terms of increasing the joining strength while ensuring the thermal shock resistance. There is no particular problem even if the distance between the welded portions is larger, and the distance may be appropriately set in consideration of the size of each metal terminal.

Each of the welded portions 17a, 17b of the electrode layers 14a, 14b has a surface containing 40% by volume or more of the metal. Such a configuration can allow the metal terminals to be satisfactorily joined to the electrically conductive honeycomb structure, resulting in improved joining reliability between the electrically conductive honeycomb structure and the metal terminals. The surface of each of the welded portions 17a, 17b containing 40% by volume or more of the metal has any upper limit of the volume ratio of the metal and the upper limit may be appropriately designed according to the thickness of the surface. The volume ratio of the metal on the surface can be, for example, from 40 to 100% by volume. Further, it is preferable that the entire welded portion of the electrically conductive honeycomb structure is the surface containing 40% by volume or more of the metal. Such a configuration can lead to an increased number of surfaces on which the electrically conductive honeycomb structure and the metal terminals are satisfactorily joined, resulting in further improved joining reliability between the electrically conductive honeycomb structure and the metal terminals.

Each of the welded portions 17a, 17b of the electrode layers 14a, 14b preferably has a depth of the surface containing 40% by volume or more of the metal of from 0.05 to 5 mm. If the depth of the surface containing 40% by volume or more of the metal is less than 0.05 mm, joining failure may be generated between the honeycomb structure and the metal terminals. If the depth of the surface containing 40% by volume or more of the metal is more than 5 mm, a difference in thermal expansion from the ceramics of the honeycomb structure may be increased, resulting in cracking. Each of the welded portions 17a, 17b of the electrode layers 14a, 14b preferably has a depth of the surface containing 40% by volume or more of the metal of from 0.05 to 2 mm, and more preferably from 0.05 to 0.5 mm.

By supporting the catalyst on the electric heating type support 20, the electric heating type support 20 can be used as a catalyst. For example, a fluid such as an exhaust gas from a motor vehicle can flow through the flow paths of the plurality of cells 15. Examples of the catalyst include noble metal catalysts or catalysts other than them. Illustrative examples of the noble metal catalysts include a three-way catalyst and an oxidation catalyst obtained by supporting a noble metal such as platinum (Pt), palladium (Pd) and rhodium (Rh) on surfaces of pores of alumina and containing a co-catalyst such as ceria and zirconia, or a lean nitrogen oxides trap catalyst (LNT catalyst) containing an alkaline earth metal and platinum as storage components for nitrogen oxides ($NO_x$). Illustrative examples of a catalyst that does not use the noble metal include a NOx selective catalytic reduction catalyst (SCR catalyst) containing a copper-substituted or iron-substituted zeolite, and the like. Further, two or more catalysts selected from the group consisting of those catalysts may be used. A method for supporting the catalyst is not particularly limited, and it can be carried out according to a conventional method for supporting the catalyst on the honeycomb structure.

(2. Method for Producing Electric Heating Type Support)

A method for producing the electric heating type support 20 according to the present invention will now be illustratively described. In an embodiment, the method for producing the electric heating type support 20 according to the present invention includes: a step A1 of obtaining an unfired honeycomb structure portion with an electrode layer forming paste; a step A 2 of firing the unfired honeycomb structure portion with the electrode layer forming paste to form an electrically conductive honeycomb structure; and a step A3 of welding metal terminals to the electrically conductive honeycomb structure.

The step A1 is to prepare a honeycomb formed body that is a precursor of the honeycomb structure portion, and apply an electrode layer forming paste to a side surface of the honeycomb formed body to obtain an unfired honeycomb structure portion with the electrode layer forming paste. The preparation of the honeycomb formed body can be carried out in accordance with a method for preparing a honeycomb formed body in a known method for producing a honeycomb structure portion. For example, first, a forming material is prepared by adding metallic silicon powder (metallic silicon), a binder, a surfactant(s), a pore former, water, and the like to silicon carbide powder (silicon carbide). It is preferable that a mass of metallic silicon is from 10 to 40% by mass relative to the total of mass of silicon carbide powder and mass of metallic silicon. The average particle diameter of the silicon carbide particles in the silicon carbide powder is preferably from 3 to 50 μm, and more preferably from 3 to 40 μm. The average particle diameter of the metallic silicon (the metallic silicon powder) is preferably from 2 to 35 μm. The average particle diameter of each of the silicon carbide particles and the metallic silicon (metallic silicon particles) refers to an arithmetic average diameter on volume basis when frequency distribution of the particle size is measured by the laser diffraction method. The silicon carbide particles are fine particles of silicon carbide forming the silicon carbide powder, and the metallic silicon particles are fine particles of metallic silicon forming the metallic silicon powder. It should be noted that this is formulation for forming raw materials in the case where the material of the honeycomb structure portion is the silicon-silicon carbide composite material. In the case where the material of the honeycomb structure portion is silicon carbide, no metallic silicon is added.

Examples of the binder include methyl cellulose, hydroxypropylmethyl cellulose, hydroxypropoxyl cellulose, hydroxyethyl cellulose, carboxymethyl cellulose, polyvinyl alcohol and the like. Among these, it is preferable to use methyl cellulose in combination with hydroxypropoxyl cellulose. The content of the binder is preferably from 2.0 to 10.0 parts by mass when the total mass of the silicon carbide powder and the metallic silicon powder is 100 parts by mass.

The content of water is preferably from 20 to 60 parts by mass when the total mass of the silicon carbide powder and the metallic silicon powder is 100 parts by mass.

The surfactant that can be used includes ethylene glycol, dextrin, fatty acid soaps, polyalcohol and the like. These may be used alone or in combination of two or more. The content of the surfactant is preferably from 0.1 to 2.0 parts by mass when the total mass of the silicon carbide powder and the metallic silicon powder is 100 parts by mass.

The pore former is not particularly limited as long as the pore former itself forms pores after firing, including, for example, graphite, starch, foamed resins, water absorbing resins, silica gel and the like. The content of the pore former is preferably from 0.5 to 10.0 parts by mass when the total mass of the silicon carbide powder and the metallic silicon powder is 100 parts by mass. An average particle diameter of the pore former is preferably from 10 to 30 μm. If the average particle diameter is less than 10 μm, pores may not be sufficiently formed. If the average particle diameter is more than 30 μm, a die may be clogged during forming. The average particle diameter of the pore former refers to an arithmetic average diameter on volume basis when frequency distribution of the particle size is measured by the laser diffraction method. When the pore former is the water absorbing resin, the average particle diameter of the pore former is an average particle diameter after water absorption.

Then, the resulting forming raw materials are kneaded to form a green body, and the green body is then extruded to prepare a honeycomb structure. In extrusion molding, a die having a desired overall shape, cell shape, partition wall thickness, cell density and the like can be used. Preferably, the resulting honeycomb structure is then dried. When the length in the central axis direction of the honeycomb structure is not the desired length, both the end faces of the honeycomb structure can be cut to the desired length. The honeycomb structure after drying is referred to as a honeycomb dried body.

The electrode layer forming paste for forming electrode layers is then prepared. The electrode layer forming paste can be formed by appropriately adding and kneading various additives to raw material powder (metal powder, ceramic powder, and the like) formulated according to required characteristics of the electrode layers. When one forms each electrode layer as a laminated structure, the joining strength between each metal terminal and each electrode layer tends to be improved by increasing an average particle diameter of the metal powder in the past for the second electrode layer, as compared with an average particle diameter of the metal powder in the paste for the first electrode layer. The average particle diameter of the metal powder refers to an arithmetic average diameter on volume basis when frequency distribution of the particle diameter is measured by the laser diffraction method.

The resulting electrode layer forming paste is applied to the side surface of the honeycomb formed body (typically, the honeycomb dried body) to obtain an unfired honeycomb structure portion with an electrode layer forming paste. The method for preparing the electrode layer forming paste and the method for applying the electrode layer forming paste to the honeycomb formed body can be performed according to a known method for producing a honeycomb structure. However, in order to achieve lower electrical resistivity, it is possible to increase a metal content ratio or to decrease the particle diameter of the metal particles as compared with the honeycomb structure portion.

As a variation of the method for producing the electrically conductive honeycomb structure, in the step A1, the honeycomb formed body may be temporarily fired before applying the electrode layer forming paste. That is, in this variation, the honeycomb formed body is fired to produce a honeycomb fired body, and the electrode fired paste is applied to the honeycomb fired body.

In the step A2, the unfired honeycomb structure portion with the electrode layer forming paste is fired to obtain an electrically conductive honeycomb structure. Prior to firing, the unfired honeycomb structure with the electrode layer forming paste may be dried. Also, prior to firing, degreasing may be carried out to remove the binder and the like. As the firing conditions, the unfired honeycomb structure is preferably heated in an inert atmosphere such as nitrogen or argon at 1400 to 1500° C. for 1 to 20 hours. After firing, an oxidation treatment is preferably carried out at 1200 to 1350° C. for 1 to 10 hours in order to improve durability. The methods of degreasing and firing are not particularly limited, and they can be carried out using an electric furnace, a gas furnace, or the like.

Figure 3:
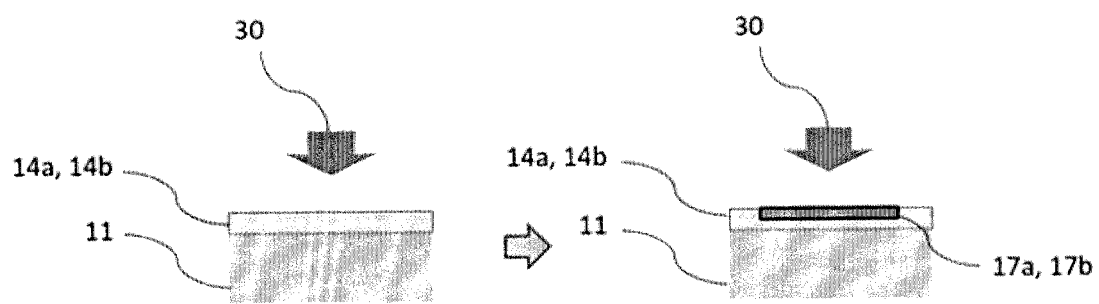
FIG. 3 is a schematic cross-sectional view near a joined portion between a honeycomb structure and a metal terminal, for showing a welding method according to Embodiment 1 of the present invention.

In the step A3, a pair of metal terminals is welded to the surfaces of the electrode layers on the honeycomb structure portion of the electrically conductive honeycomb structure. A preferable welding method may be laser welding, in terms of control of the welded area and production efficiency. In this case, the laser irradiation is carried out twice in total by separating it into a previous stage and a subsequent stage. More particularly, first, as shown in FIG. 3, a first thermal energy is applied to the surfaces of the electrode layers 14a, 14b on the pillar shaped honeycomb structure portion 11 by a laser 30 to form a surface containing 40% by volume or more of the metal. The portions having the surface containing 40% by volume or more of the metal are defined as welded portions 17a, 17b. At this time, the metal component contained in the electrode layers is melted by a thermal energy of the laser and aggregated near the surfaces. By adjusting the thermal energy, the surface containing 40% by volume or more of the metal can be formed.

In the above method, the surface containing 40% by volume or more of the metal is formed by aggregating the metal component on the surfaces of the electrode layers by laser irradiation at the previous stage. However, the method for forming the surface containing 40% by volume or more of the metal is not limited thereto. For example, the pillar shaped honeycomb structure portion is composed of the ceramics having a melting point of 1600° C. or less and the metal, and then the first thermal energy may be applied to the surface of the electrically conductive honeycomb structure. At this time, at least a part of the ceramic components on the surfaces of the electrode layers is evaporated by the first thermal energy. By thus evaporating the ceramic components on the surfaces of the electrode layers, the surface containing 40% by volume or more of the metal in the electrode layers may be formed.

The metal terminals are then arranged at portions each having the surface containing 40% or more of the metal in the electrode layers (the welded portions 17a, 17b). Subsequently, a second thermal energy larger than the first thermal energy is applied from the metal terminal side to join the metal terminals to the surface of the electrically conductive honeycomb structure.

The laser output of the above laser irradiation at the previous stage can be, for example, from 20 to 100 W/mm$^2$, although it depends on the materials and like of the electrode layers. Further, the laser output of the laser irradiation at the subsequent stage can be, for example, from 150 to 400 W/mm$^2$, although it depends on the materials and thicknesses of the metal terminals.

In general, when welding the honeycomb structure to the metal terminals by laser irradiation, a decreased amount of the metal contained on the honeycomb structure side results in a decreased number of surfaces that are melted with the metal terminals. As a result, it causes a problem that the honeycomb structure is not satisfactorily joined to the metal terminals. However, according to the welding method discussed in the embodiment of the present invention, the metal terminals can be joined after the metal content in the surface on the honeycomb structure side is increased. Therefore, in the honeycomb structure, it is possible to ensure the surfaces that are melted with the metal terminals and to join the honeycomb structure to the metal terminals while suppressing the difference in thermal expansion between the honeycomb structure and the metal terminals. Therefore, it is possible to satisfactorily join the metal terminals to the honeycomb structure, and also suppress cracking. As a result, it is possible to provide an electric heating type support having good joining reliability between the metal terminals and the honeycomb structure.

Embodiment 2

Figure 4:
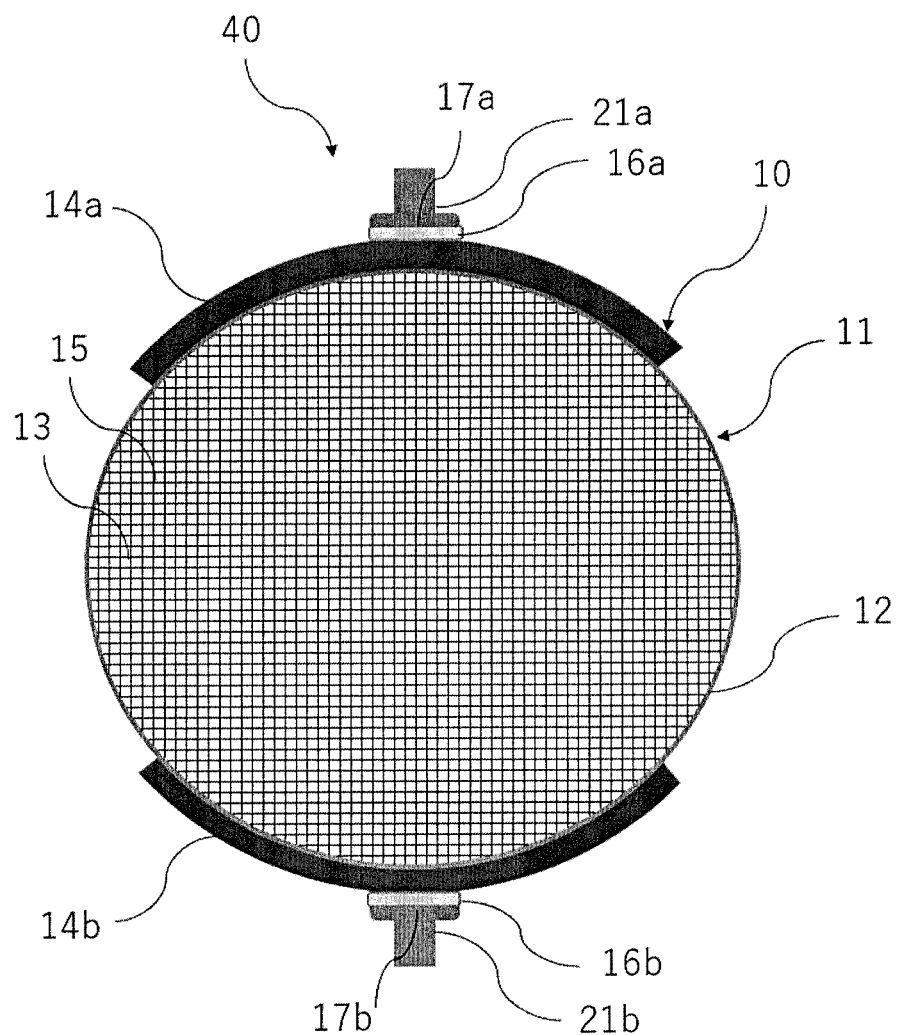
FIG. 4 is a schematic cross-sectional view of an electric heating type support according to Embodiment 2 of the present invention, which is perpendicular to a cell extending direction.

FIG. 4 is a schematic cross-sectional view of an electric heating type support 40 according to Embodiment 2 of the present invention, which is perpendicular to the cell extending direction. As shown in FIG. 4, the electric heating type support 40 according to Embodiment 2 of the present invention is different from the electric heating type support 20 according to Embodiment 1 in that the electric heating type support 40 further includes a pair of conductive ceramic welding base layers 16a, 16b disposed so as to face each other across the central axis of the pillar shaped honeycomb structure portion, between the electrode layers 14a, 14b and the metal terminals 21a, 21b, respectively. The pair of welding base layers 16a, 16b includes the welded portions 17a, 17b, respectively. In Embodiment 2, each of the welded portions 17a, 17b has the surface containing 40% by volume or more of the metal.

The welding base layers 16a, 16b serve as bases for laser welding upon joining with the metal terminals 21a, 21b. Preferably, they have a function as stress relaxation layers. That is, when a difference in a linear expansion coefficient between the electrode layers 14a, 14b and the metal terminals 21a, 21b is larger, clacking may be generated in the electrode layers 14a, 14b due to thermal stress. Therefore, it is preferable that the welding base layers 16a, 16b have a function of alleviating the thermal stress caused by the difference in the linear expansion coefficient between the electrode layers 14a, 14b and the metal terminals 21a, 21b. This can prevent cracking from being generated in the electrode layers 14a, 14b, at the time of welding the metal terminals 21a, 21b to the electrode layers 14a, 14b, or due to repeated fatigue of the thermal cycle.

The welding base layers 16a, 16b can be composed of a composite material of a metal and conductive ceramics (cermet). Examples of the metal include a single metal of Cr, Fe, Co, Ni, Si or Ti, or an alloy containing at least one metal selected from the group consisting of those metals. Examples of the conductive ceramic include, but not limited to, silicon carbide (SiC), and metal compounds such as metal silicides such as tantalum silicide ($TaSi_2$) and chromium silicide ($CrSi_2$). Specific examples of the composite material of the metal and the conductive ceramics (cermet) include a composite material of metallic silicon and silicon carbide, a composite material of metallic silicide such as tantalum silicide and chromium silicide, metallic silicon and silicon carbide, and a composite material containing, in addition to the above one or more metals, one or more insulating ceramics such as alumina, mullite, zirconia, cordierite, silicon nitride, and aluminum nitride, in terms of reduction of thermal expansion. The material of the welding base layers 16a, a16b may be preferably a combination of a metal silicide such as tantalum silicide and chromium silicide with a composite material of metallic silicon and silicon carbide, among the various metal and conductive ceramics as described above, for the reason that it can allow simultaneous firing with the pillar shaped honeycomb structure portion so that it can contribute to simplification of the producing steps.

In Embodiment 1, the unfired honeycomb structure portion with the electrode layer forming paste was prepared and fired to produce the electrically conductive honeycomb structure. At this time, in Embodiment 2, a welding base layer forming paste is also formed at the same time, and an unfired honeycomb structure portion with a welding base layer forming paste and an electrode layer forming paste can be produced and fired to form an electrically conductive honeycomb structure.

Figure 5:
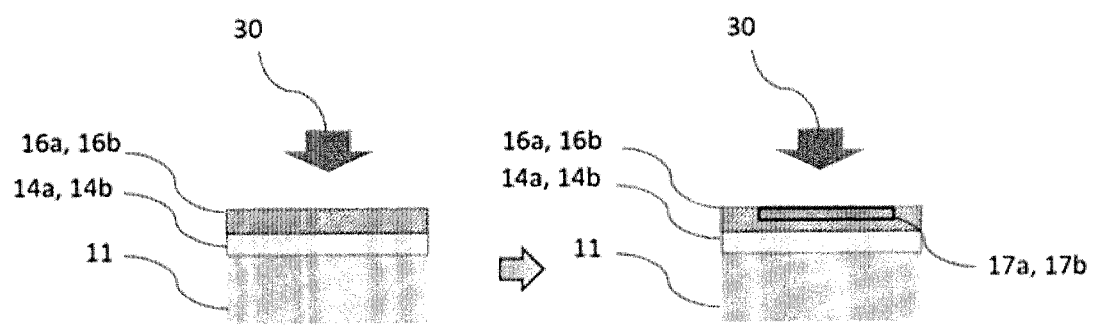
FIG. 5 is a schematic cross-sectional view near a joined portion between a honeycomb structure and a metal terminal, for showing a welding method according to Embodiment 2 of the present invention.

In Embodiment 2, a pair of metal terminals is welded to the surfaces of the welding base layers of the electrically conductive honeycomb structure. The welding method can be the same as that of Embodiment 1, and laser irradiation is carried out twice in total by separating it into a previous stage and a subsequent stage. More particularly, as shown in FIG. 5, a first thermal energy is firstly applied to the surfaces of the welding base layers 16a, 16b by a laser 30 to form surfaces each having 40% by volume or more of the metal. In this case, the surfaces each having 40% by volume or more of the metal may be formed by forming the pillar shaped honeycomb structure portion 11 from ceramics having a melting point of 1600° C. or less and a metal, and then applying the first thermal energy to the surfaces of the welding base layers 16a, 16b to evaporate the ceramic components. The metal terminals are then arranged at portions each having the surfaces each containing 40% by volume or more of the metal (welded portions 17a, 17b). A second thermal energy larger than the first thermal energy is then applied from each metal terminal side to join the metal terminals to the surface of the electrically conductive honeycomb structure. According to such a welding method, the metal terminals can be joined after increasing the metal content in the surface on the electrically conductive honeycomb structure side. Therefore, as with the first embodiment, the metal terminals and the electrically conductive honeycomb structure can be satisfactorily joined to each other and cracking can be suppressed. As a result, it is possible to provide an electric heating type support having good joining reliability between the metal terminals and the electrically conductive honeycomb structure.

Embodiment 3

Figure 6:
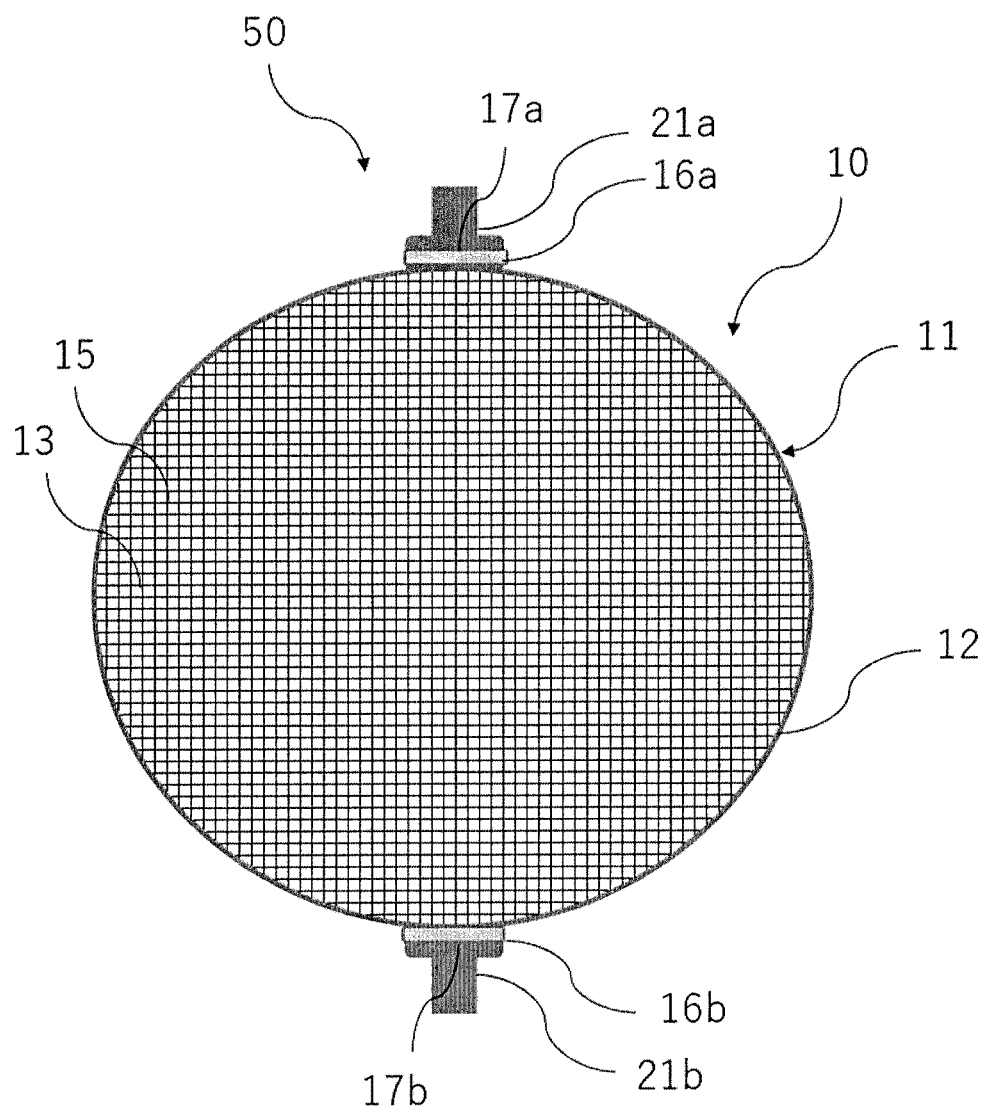
FIG. 6 is a schematic cross-sectional view of an electric heating type support according to Embodiment 3 of the present invention, which is perpendicular to a cell extending direction.

FIG. 6 is a schematic cross-sectional view of an electric heating type support 50 according to Embodiment 3 of the present invention, which is perpendicular to the cell extending direction. As shown in FIG. 6, the electric heating type support 50 according to Embodiment 3 of the present invention is different from the electric heating type support 40 according to Embodiment 2 in that the former does not include the electrode layers 14a, 14b. A pair of welding base layers 16a, 16b have welded portions 17a, 17b, respectively. In Embodiment 3, each of the welded portions 17a, 17b has the surface containing 40% by volume or more of the metal.

In Embodiment 1, the unfired honeycomb structure with the electrode layer forming paste was prepared and fired to produce an electrically conductive honeycomb structure. At this time, in Embodiment 3, the electrode layer forming paste is not formed, and an unfired honeycomb structure portion with the welding base layer forming paste is prepared and fired to produce an electrically conductive honeycomb structure.

Figure 7:
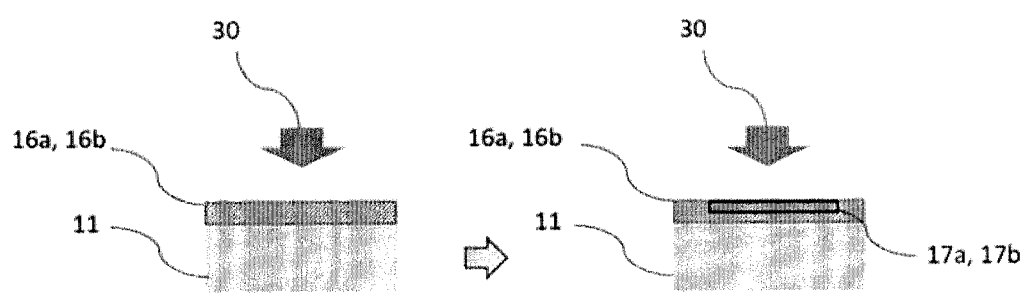
FIG. 7 is a schematic cross-sectional view near a joined portion between a honeycomb structure and a metal terminal, for showing a welding method according to Embodiment 3 of the present invention.

In Embodiment 3, a pair of metal terminals is welded to the surfaces of the welding base layers of the electrically conductive honeycomb structure. The welding method can be the same as that of Embodiment 1, and laser irradiation is carried out twice in total by separating it into a previous stage and a subsequent stage. More particularly, as shown in FIG. 7, a first thermal energy is applied to the surfaces of the welding base layers 16a, 16b by a laser 30 to form surfaces each containing 40% by volume or more of the metal. In this case, the surfaces each containing 40% by volume or more of the metal may be formed by forming the pillar shaped honeycomb structure portion 11 from ceramics having a melting point of 1600° C. or less and a metal, and then applying the first thermal energy to the surfaces of the welding base layers 16a, 16b to evaporate the ceramic components. The metal terminals are then arranged at portions each having the surfaces each containing 40% by volume or more of the metal (welded portions 17a, 17b). Thereafter, the metal terminals are joined to the electrically conductive honeycomb structure by the same steps as those of Embodiment 2. According to such a welding method, it is possible to provide an electric heating type support having good joining reliability between the metal terminals and the electrically conductive honeycomb structure.

Embodiment 4

Figure 8:
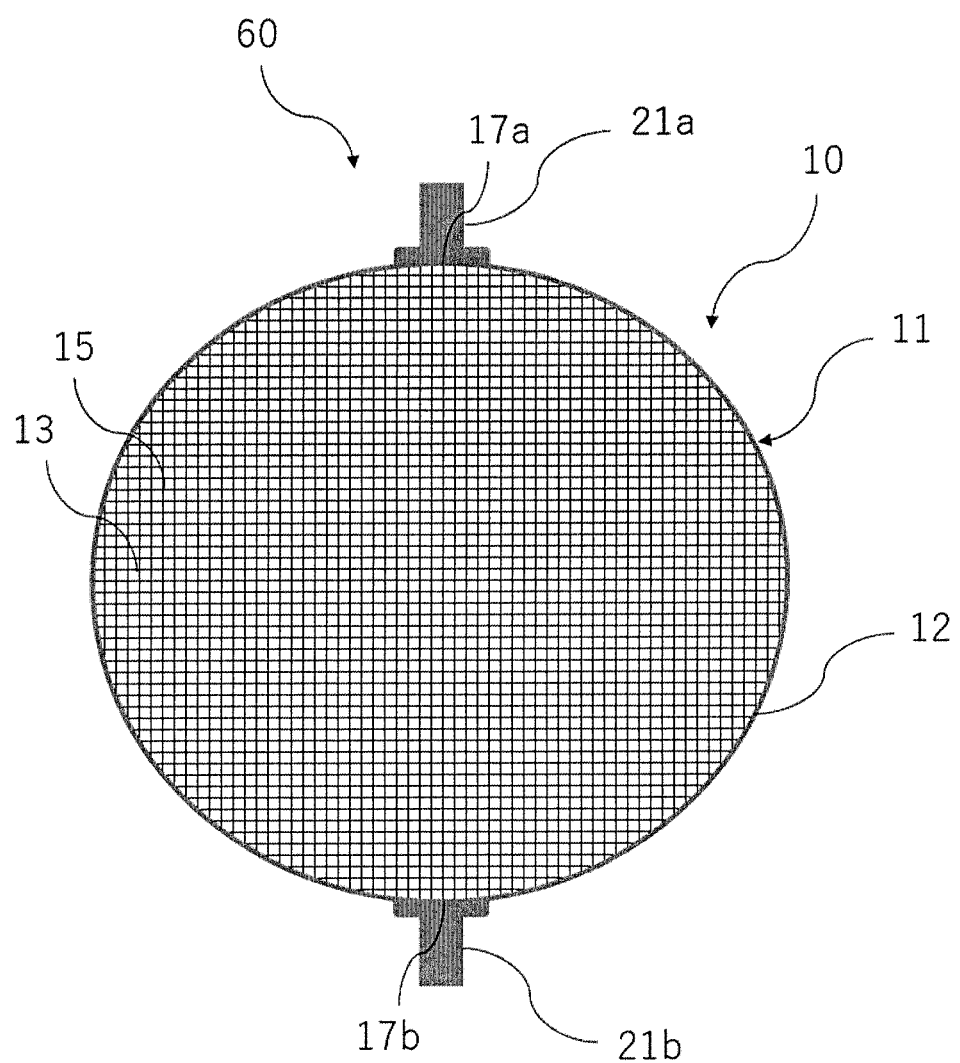
FIG. 8 is a schematic cross-sectional view of an electric heating type support according to Embodiment 4 of the present invention, which is perpendicular to a cell extending direction.

FIG. 8 is a schematic cross-sectional view of an electric heating type support 60 according to Embodiment 4 of the present invention, which is perpendicular to the cell extending direction. As shown in FIG. 8, the electric heating type support 60 according to Embodiment 4 of the present invention is different from the electric heating type support 50 according to Embodiment 3 in that the former does not include the welding base layers 16a, 16b. The pillar shaped honeycomb structure portion 11 includes welded portions 17a, 17b. In Embodiment 4, the pillar shaped honeycomb structure portion 11 has the surface containing 40% by volume or more of the metal.

In Embodiment 1, the unfired honeycomb structure portion with the electrode layer forming paste was prepared and fired to produce the electrically conductive honeycomb structure. At this time, in Embodiment 4, the electrode layer forming paste is not formed, and only an unfired honeycomb structure portion is prepared and fired to produce an electrically conductive honeycomb structure.

Figure 9:
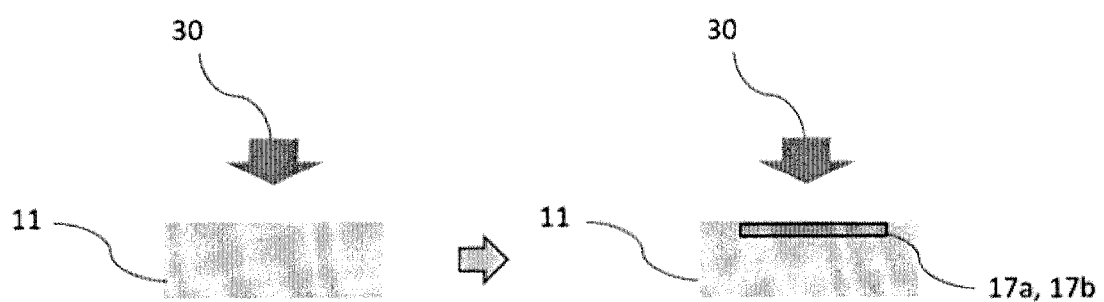
FIG. 9 is a schematic cross-sectional view near a joined portion between a honeycomb structure and a metal terminal, for showing a welding method according to Embodiment 4 of the present invention.

In Embodiment 4, a pair of metal terminals is welded to the surface of the honeycomb structure portion of the honeycomb structure. The welding method can be the same as that of Embodiment 1, and laser irradiation is carried out twice in total by separating it into a previous stage and a subsequent stage. More particularly, as shown in FIG. 9, a first thermal energy is firstly applied to the surface of the pillar shaped honeycomb structure portion 11 by a laser 30 to form surfaces each containing 40% by volume or more of the metal. In this case, the surfaces each containing 40% by volume or more of the metal may be formed by forming the pillar shaped honeycomb structure portion 11 from ceramics having a melting point of 1600° C. or less and a metal, and then applying the first thermal energy to evaporate the ceramic components. The metal terminals are then arranged at portions each having the surfaces each containing 40% by volume or more of the metal (welded portions 17a, 17b). Thereafter, the metal terminals are joined to the electrically conductive honeycomb structure by the same steps as those of Embodiment 2. According to such a welding method, it is possible to provide an electric heating type support having good joining reliability between the metal terminals and the electrically conductive honeycomb structure.
(3. Exhaust Gas Purifying Device)

Each of the electric heating type supports according to the above embodiments of the present invention can be used for an exhaust gas purifying device. The exhaust gas purifying device includes the electric heating type support and a can body for holding the electric heating type support. In the exhaust gas purifying device, the electric heating type support can be installed in an exhaust gas flow path for allowing an exhaust gas from an engine to flow. As the can body, a metal tubular member or the like for accommodating the electric heating type support can be used.

EXAMPLES

Hereinafter, Examples is illustrated for better understanding of the present invention and its advantages, but the present invention is not limited to these Examples.

Example 1

(1. Production of Circular Pillar Shaped Green Body)

Silicon carbide (SiC) powder and metallic silicon (Si) powder were mixed in a mass ratio of 80:20 to prepare a ceramic raw material. To the ceramic raw material were added hydroxypropylmethyl cellulose as a binder, a water absorbing resin as a pore former, and water to form a forming raw material. The forming raw material was then kneaded by means of a vacuum green body kneader to prepare a circular pillar shaped green body. The content of the binder was 7 parts by mass when the total of the silicon carbide (SiC) powder and the metallic silicon (Si) powder was 100 parts by mass. The content of the pore former was 3 parts by mass when the total of the silicon carbide (SiC) powder and the metallic silicon (Si) powder was 100 parts by mass. The content of water was 42 parts by mass when the total of the silicon carbide (SiC) powder and the metallic silicon (Si) powder was 100 parts by mass. The average particle diameter of the silicon carbide powder was 20 μm, and the average particle diameter of the metallic silicon powder was 6 μm. The average particle diameter of the pore former was 20 μm. The average particle diameter of each of the silicon carbide powder, the metallic silicon powder and the pore former refers to an arithmetic mean diameter on volume basis, when measuring frequency distribution of the particle size by the laser diffraction method.
(2. Production of Honeycomb Dried Body)

The resulting pillar shaped green body was formed using an extruder having a grid pattern-like die structure to obtain a circular pillar shaped honeycomb formed body in which each cell had a square shape in a cross section perpendicular to the flow path direction of the cells. The honeycomb formed body was subjected to high-frequency dielectric heating and drying and then dried at 120° C. for 2 hours using a hot air drier, and a predetermined amount of both end faces were cut to prepare a honeycomb dried body.
(3. Preparation of Electrode Layer Forming Paste)

Tantalum silicide ($TaSi_2$) powder, metallic silicon (Si) powder, silicon carbide (SiC) powder, methyl cellulose, glycerin, and water were mixed by a planetary centrifugal mixer to prepare a first electrode layer forming paste. The $TaSi_2$ powder, the Si powder, and the SiC powder were blended in a volume ratio of $TaSi_2$ powder:Si powder:SiC powder=50:30:20. When the total of $TaSi_2$ powder, Si powder and SiC powder was 100 parts by mass, methyl cellulose was 0.5 parts by mass, glycerin was 10 parts by mass, and water was 38 parts by mass. The average particle diameter of the tantalum silicide powder was 7 μm. The average particle diameter of the metallic silicon powder was 6 μm. The average particle diameter of the silicon carbide powder was 35 μm. Each of these average particle diameters refers to an arithmetic average diameter on volume basis when frequency distribution of the particle diameter is measured by the laser diffraction method.

(4. Preparation of Welding Base Layer Forming Paste)

Chromium silicide ($CrSi_2$) powder, metallic silicon (Si) powder, methyl cellulose, glycerin, and water were mixed by a planetary centrifugal mixer to prepare a welding base layer forming paste. Here, the $CrSi_2$ powder and the Si powder were blended in a volume ratio of $CrSi_2$ powder:Si powder=90:10. When the total of the $CrSi_2$ powder and the Si powder was 100 parts by mass, methyl cellulose was 0.5 parts by mass, glycerin was 10 parts by mass, and water was 38 parts by mass. The average particle diameter of the chromium silicide powder was 7 μm. The average particle diameter of the metallic silicon powder was 6 μm.

(5. Application of Paste)

The electrode layer forming paste as described above was applied onto an outer surface of the outer peripheral wall of the above honeycomb dried body at two positions so as to face each other across the central axis. Each applied portion was formed in a belt shape over the full length between both end faces of the honeycomb dried body. The welding base layer forming paste was applied only to regions required for welding the metal terminals so as to partially cover the applied portions of the electrode layer forming paste. The honeycomb dried body after application of the electrode layer forming paste and the welding base layer forming paste was dried at 120° C. to obtain an unfired honeycomb structure portion with an electrode layer forming paste and a welding base layer forming paste.

(6. Firing)

The unfired honeycomb structure portion with the electrode layer forming paste and the welding base layer forming paste was then degreased in an air atmosphere at 550° C. for 3 hours. The degreased unfired honeycomb structure portion with the electrode layer forming paste and the welding base layer forming paste was then fired and subjected to an oxidization treatment to produce a honeycomb structure. The firing was carried out in an argon atmosphere at 1450° C. for 2 hours. The oxidation treatment was carried out in the atmosphere at 1300° C. for one hour.

The honeycomb structure had circular end faces each having a diameter of 100 mm, and a height (a length in the flow path direction of the cells) of 100 mm. The cell density was 93 cells/cm², the thickness of the partition wall was 101.6 μm, the porosity of the partition walls was 45%, and the average pore diameter of the partition walls was 8.6 μm. The thickness of each electrode layer was 0.3 mm, and the thickness of each welding base layer was 0.2 mm. The electrical resistivity at 400° C. was measured by a four-terminal method using samples having the same materials as those of the honeycomb structure, the electrode layer, and the welding base layer, indicating that it was 5 Ωcm, 0.01 Ωcm, and 0.001 Ωcm, respectively.

(7. Welding of Metal Terminals)

Laser irradiation at the previous stage was carried out on the welding base layers of the honeycomb structure obtained under the above production conditions using a fiber laser welding machine. At this time, the laser output was 80 W/mm². Subsequently, in the positions where the laser irradiation at the previous stage was carried out, SUS plate-shaped metal terminals each having a thickness of 0.4 mm were arranged. Subsequently, using the fiber laser welding machine, laser irradiation at the subsequent stage was carried out on the plate-shaped metal terminals. At this time, the laser output of the laser irradiation at the previous stage was 50 W/mm² and the laser spot diameter was 4.0 mm. Also, the laser output of the laser irradiation at the subsequent stage was 300 W/mm² and the laser spot diameter was 1.0 mm. Thus, the SUS plate-shaped metal terminals were joined onto the welding base layers of the honeycomb structure.

Examples 2, 3

A sample of Example 2 was prepared in the same manner as in Example 1 except that the laser output of the laser irradiation at the previous stage was 60 W/mm².

A sample of Example 3 was prepared in the same manner as in Example 1 except that the metal ratio of the welding base layer was 35 volume %.

Comparative Examples 1, 2

A sample of Comparative Example 1 was prepared in the same manner as in Example 1 except that the laser irradiation at the previous stage was not performed. A sample of Comparative Example 2 was prepared in the same manner as in Comparative Example 1 except that the metal ratio of the welding base layer was 50 volume %.

(8. Volume Ratio of Metal in Welded Portion)

For each sample of Examples and Comparative Examples, the following method was used to evaluate volume % of the metal contained in the surfaces for the welded portions of the welding base layers to the metal terminals. That is, for each sample of Examples, a scanning electron microscope (SEM) was used to obtain SEM images of welded portions between the welding base layers and the metal terminals. The SEM images were binarized, and the metal ratio was measured for portions each having a depth of from 0.05 to 5 mm in the welded portions of the welding base layers to the metal terminals.

(9. Presence or Absence of Cracks During Welding)

Whether or not cracks were generated in the vicinity of the welded portions of the honeycomb structure during the welding of the metal terminals under the above conditions was investigated at magnifications of 40 times using a magnifying glass. A case where no crack was generated was evaluated as "None", and a case where cracks were generated was evaluated as "Cracked". Although cracks were not generated in Examples 1 to 3 and Comparative Example 1, the cracks were generated in the honeycomb structure portion of Comparative Example 2.

(10. Joining Strength Test)

All the welded portions were examined for peeled portions when the metal terminals welded under the above conditions were peeled off in accordance with the peel test of JIS Z 3144: 2013. For each sample, in a case where the peeling of all the welded portions involved breakage of the honeycomb structure portion, the electrode layers or the welding base layers, it was determined that the joining strength at an interface between the metal terminal and the welding base layer was higher, and evaluated as "OK". On the other hand, in a case where the peeling did not involve breakage of the honeycomb structure portion, the electrode layers or the welding base layers and there was at least one welded portion generated at the interface between the metal terminal and the welding base layer, it was determined that the joining strength at the interface between the metal terminal and the welding base layer was lower, and evaluated as "NG".

Evaluation results are shown in Table 1.

(11. Overall Evaluation)

In a case where no crack was generated and the evaluation of the joining strength test was "OK" in the above tests 9 and 10, the overall evaluation was graded "A". On the other hand, in a case where the evaluation corresponded to at least one of the evaluations: cracks were generated and the evaluation of the joining strength test was "NG", the overall evaluation was graded "C". The overall evaluation "A" was defined as a level at which the effect of the present invention was obtained, and the overall evaluation "C" was defined as a level at which the effect of the present invention was not obtained.

TABLE 1

| | Metal Ratio (% by volume) | | | | |
|---|---|---|---|---|---|
| | Welding Base Layer | Welded Portion of Welding Base Layer | Broken Portion | Evaluation | Overall Evaluation |
| Comp. 1 | 35 | 35 | Welded Portion | NG | C |
| Ex. 1 | 40 | 50 | Electrode Layer | OK | A |
| Ex. 2 | 40 | 60 | Electrode Layer | OK | A |
| Ex. 3 | 35 | 50 | Electrode Layer | OK | A |
| Comp. 2 | 50 | 50 | Honeycomb Structure Portion | OK | C |

(12. Discussion)

In Examples 1 to 3, the metal ratio of the welding base layer was decreased, whereby a difference in thermal expansion between the welding base layers and the honeycomb structure portion was decreased, and the breakage of the honeycomb structure portion during firing was suppressed. Further, the metal ratio at the welded portions was increased, whereby the ratio of the metal joined during welding was increased and the welding was possible. As a result, when the joining strength test was conducted, the breakage was generated in the electrode layers having the lowest strength.

In Comparative Example 1, the metal ratio at the welded portions was lower, so that the ratio of the metal joined during welding was not sufficient, and the welding was not successful.

In Comparative Example 2, the metal ratio of the welding base layers was higher than 40%, the difference in thermal expansion between the welding base layers and the honeycomb structure portion was increased, and the honeycomb structure portion was broken during firing, resulting in cracks.

DESCRIPTION OF REFERENCE NUMERALS 10 honeycomb structure
11 pillar shape honeycomb structure
12 outer peripheral wall
13 partition wall
14a, 14b electrode layer
15 cell
16a, 16b welding base layer
17a, 17b welded portion
20, 40, 50, 60 electric heating type support
21a, 21b metal terminal
30 laser

The invention claimed is:

1. An electric heating type support, comprising:
an electrically conductive honeycomb structure comprising a pillar shaped honeycomb structure portion, the pillar shaped honeycomb structure portion comprising: an outer peripheral wall; and porous partition walls disposed on an inner side of the outer peripheral wall, the porous partition walls defining a plurality of cells, each cell penetrating from one end face to other end face to form a flow path; and
a pair of metal terminals disposed so as to face each other across a central axis of the pillar shaped honeycomb structure portion, each metal terminal being joined to a surface of the electrically conductive honeycomb structure via a welded portion,
wherein the pillar shaped honeycomb structure portion is composed of ceramics and a metal, the pillar shaped honeycomb structure portion containing 40% by volume or less of the metal, and
wherein the welded portion of the electrically conductive honeycomb structure has a surface containing 40% by volume or more of the metal.

2. The electric heating type support according to claim 1, wherein the surface containing 40% by volume or more of the metal in the welded portion of the electrically conductive honeycomb structure has a depth of from 0.05 to 5 mm.

3. The electric heating type support according to claim 1, wherein the electrically conductive honeycomb structure comprises a pair of electrode layers composed of ceramics and a metal on a surface of the outer peripheral wall of the pillar shaped honeycomb structure portion,
wherein one electrode layer of the pair of electrode layers is provided so as to face other electrode layer of the pair of electrode layers across the central axis of the pillar shaped honeycomb structure portion, and
wherein the pair of electrode layers comprise the welded portion.

4. The electric heating type support according to claim 1, wherein the electrically conductive honeycomb structure comprises a pair of welding base layers composed of ceramics and a metal, the welding base layers being disposed on a surface of the outer peripheral wall of the pillar shaped honeycomb structure portion so as to face each other across the central axis of the pillar shaped honeycomb structure portion, and
wherein the pair of welding base layers comprise the welded portion.

5. The electric heating type support according to claim 4, further comprising an electrode layer composed of ceramics and a metal between the outer peripheral wall and each of the welding base layers.

6. The electric heating type support according to claim 1, wherein the entire welded portion of the electrically conductive honeycomb structure is the surface containing 40% by volume or more of the metal.

7. The electric heating type support according to claim 1, comprising a plurality of the welded portions.

8. An exhaust gas purifying device, comprising:
the electric heating type support according to claim 1; and
a can body for holding the electric heating type support.

9. A method for producing an electric heating type support, the electric heating type support comprising:
an electrically conductive honeycomb structure comprising a pillar shaped honeycomb structure portion composed of ceramics and a metal, the pillar shaped honeycomb structure portion comprising: an outer peripheral wall; and porous partition walls disposed on an inner side of the outer peripheral wall, the porous partition walls defining a plurality of cells, each cell penetrating from one end face to other end face to form a flow path; and a pair of metal terminals disposed so as to face each other across a central axis of the pillar shaped honeycomb structure portion, the method comprising the steps of:

forming a surface containing 40% or more of the metal by applying a first thermal energy to a surface of the electrically conductive honeycomb structure; and disposing each of the metal terminals in a portion having the surface containing 40% or more of the metal; and applying a second thermal energy larger than the first thermal energy to each of the metal terminals to join each of the metal terminals to the surface of the electrically conductive honeycomb structure.

10. The method for producing the electric heating type support according to claim 9, wherein the step of forming the surface containing 40% or more of the metal comprises applying the first thermal energy to the surface of the electrically conductive honeycomb structure to melt the metal of the surface, thereby aggregating the metal on the surface to form the surface containing 40% or more of the metal.

11. A method for producing an electric heating type support, the electric heating type support comprising:

an electrically conductive honeycomb structure comprising a pillar shaped honeycomb structure portion, the pillar shaped honeycomb structure portion being composed of ceramics having a melting point of 1600° C. or less and a metal and comprising: an outer peripheral wall; and porous partition walls disposed on an inner side of the outer peripheral wall, the porous partition walls defining a plurality of cells, each cell penetrating from one end face to other end face to form a flow path; and a pair of metal terminals disposed so as to face each other across a central axis of the pillar shaped honeycomb structure portion, the method comprising the steps of:

applying a first thermal energy to a surface of the electrically conductive honeycomb structure to evaporate at least a part of the ceramics to form a surface containing 40% or more of the metal; and disposing each of the metal terminals in a portion having the surface containing 40% or more of the metal; and applying a second thermal energy larger than the first thermal energy to each of the metal terminals to join each of the metal terminals to the surface of the electrically conductive honeycomb structure.

* * * * *